US007285595B2

(12) United States Patent
Quincy, III et al.

(10) Patent No.: US 7,285,595 B2
(45) Date of Patent: Oct. 23, 2007

(54) SYNERGISTIC FLUOROCHEMICAL TREATMENT BLEND

(75) Inventors: Roger Bradshaw Quincy, III, Cumming, GA (US); Hue Scott Snowden, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 76 days.

(21) Appl. No.: 10/881,520

(22) Filed: Jun. 30, 2004

(65) Prior Publication Data

US 2006/0003167 A1   Jan. 5, 2006

(51) Int. Cl.
*C08L 27/12* (2006.01)

(52) U.S. Cl. .................. 525/199; 525/50; 524/500; 524/544; 428/421

(58) Field of Classification Search ................ 524/500, 524/544; 428/421; 525/199, 50
See application file for complete search history.

(56) References Cited

U.S. PATENT DOCUMENTS

| 3,692,618 A | 9/1972 | Dorschner et al. |
| 3,730,918 A | 5/1973 | Teti et al. |
| 3,770,856 A | 11/1973 | Ueke et al. |
| 3,802,817 A | 4/1974 | Matsuki et al. |
| 3,849,241 A | 11/1974 | Butin et al. |
| 3,855,046 A | 12/1974 | Hansen et al. |
| 3,902,957 A | 9/1975 | Kozlowski |
| 3,920,508 A | 11/1975 | Yonemori |
| 3,973,068 A | 8/1976 | Weber et al. |
| 4,041,203 A | 8/1977 | Brock et al. |
| 4,070,218 A | 1/1978 | Weber et al. |
| 4,260,565 A | 4/1981 | D'Amico et al. |
| 4,307,143 A | 12/1981 | Meitner |
| 4,340,563 A | 7/1982 | Appel et al. |

(Continued)

FOREIGN PATENT DOCUMENTS

| EP | 1207182 | 5/2002 |
| WO | WO 00/06817 | 2/2000 |
| WO | WO 01/92418 | 12/2001 |
| WO | WO 03/104310 A2 | 12/2003 |

OTHER PUBLICATIONS

Rao, Nandakumar S. et al., "Textile Finishes and Fluorosurfactants", *Organofluorine Chemistry* (Principles and Commercial Applications), 1994 Plenum Press, NY, ISBN 0-306-44610-3, pp. 321-338.

(Continued)

*Primary Examiner*—David W. Wu
*Assistant Examiner*—Henry S. Hu
(74) *Attorney, Agent, or Firm*—Dority & Manning, P A (57) ABSTRACT

Disclosed herein are fluorochemical blends suitable for producing repellency to low surface tension fluids such as, for example, alcohols, aldehydes, ketones and hydrophilic liquids, such as those containing surfactants. The fluorochemical blends may be beneficially utilized to produce low surface tension fluid repellency in extruded articles such as fibers and fibrous web materials, films and foams. Such repellent extruded articles are highly useful in a wide range of limited use and disposable products such as, for example, personal care products, mortuary and veterinary products, protective wear garments, and medical care garments and products. The fluorochemical blends include at least a first fluorochemical having a majority of first fluoroaliphatic groups having 4 or fewer carbon atoms, and a second fluorochemical having a majority of second fluoroaliphatic groups having 6 or more carbon atoms.

11 Claims, 2 Drawing Sheets

U.S. PATENT DOCUMENTS

| | | |
|---|---|---|
| 4,374,888 A | 2/1983 | Bornslaeger |
| 4,451,589 A | 5/1984 | Morman et al. |
| 4,488,928 A | 12/1984 | Ali Khan et al. |
| 4,707,398 A | 11/1987 | Wisneski et al. |
| 4,855,360 A | 8/1989 | Duchesne et al. |
| 4,857,251 A | 8/1989 | Nohr et al. |
| 4,863,983 A | 9/1989 | Johnson et al. |
| 4,920,168 A | 4/1990 | Nohr et al. |
| 4,923,914 A | 5/1990 | Nohr et al. |
| 5,025,052 A | 6/1991 | Crater et al. |
| 5,057,262 A | 10/1991 | Nohr et al. |
| 5,064,802 A | 11/1991 | Stevens et al. |
| 5,108,820 A | 4/1992 | Kaneko et al. |
| 5,120,888 A | 6/1992 | Nohr et al. |
| 5,145,727 A | 9/1992 | Potts et al. |
| 5,153,157 A | 10/1992 | Hlatky et al. |
| 5,169,706 A | 12/1992 | Collier, IV et al. |
| 5,178,931 A | 1/1993 | Perkins et al. |
| 5,204,394 A | 4/1993 | Gosens et al. |
| 5,204,429 A | 4/1993 | Kaminsky et al. |
| 5,213,881 A | 5/1993 | Timmons et al. |
| 5,260,360 A | 11/1993 | Mrozinski et al. |
| 5,272,236 A | 12/1993 | Lai et al. |
| 5,278,272 A | 1/1994 | Lai et al. |
| 5,283,023 A | 2/1994 | Nohr et al. |
| 5,294,654 A | 3/1994 | Hellstern-Burnell et al. |
| 5,300,167 A | 4/1994 | Nohr et al. |
| 5,332,613 A | 7/1994 | Taylor et al. |
| 5,336,552 A | 8/1994 | Strack et al. |
| 5,336,707 A | 8/1994 | Nohr et al. |
| 5,374,696 A | 12/1994 | Rosen et al. |
| 5,382,400 A | 1/1995 | Pike et al. |
| 5,451,450 A | 9/1995 | Elderly et al. |
| 5,459,188 A | 10/1995 | Sargent et al. |
| 5,482,765 A | 1/1996 | Bradley et al. |
| 5,539,056 A | 7/1996 | Yang et al. |
| 5,539,124 A | 7/1996 | Etherton et al. |
| 5,554,775 A | 9/1996 | Krishnamurti et al. |
| 5,567,372 A | 10/1996 | Nohr et al. |
| 5,589,258 A | 12/1996 | Maddern et al. |
| 5,596,052 A | 1/1997 | Resconi et al. |
| 5,597,647 A | 1/1997 | Powers |
| 5,618,622 A | 4/1997 | Gillberg-Laforce et al. |
| 5,643,981 A | 7/1997 | Yang et al. |
| 5,681,963 A | 10/1997 | Liss |
| 5,690,949 A | 11/1997 | Weimer et al. |
| 5,696,191 A | 12/1997 | Nohr et al. |
| 5,706,804 A | 1/1998 | Baumann et al. |
| 5,708,084 A | 1/1998 | Hauenstein et al. |
| 5,736,465 A | 4/1998 | Stahl et al. |
| 5,738,111 A | 4/1998 | Weimer et al. |
| 5,789,491 A | 8/1998 | Liss et al. |
| 5,798,402 A | 8/1998 | Fitzgerald et al. |
| 5,804,625 A * | 9/1998 | Temperante et al. ........ 524/188 |
| 5,853,641 A | 12/1998 | Nohr et al. |
| 5,858,515 A | 1/1999 | Stokes et al. |
| 5,885,909 A | 3/1999 | Rudisill et al. |
| 5,898,046 A * | 4/1999 | Raiford et al. ............... 524/316 |
| 5,932,497 A | 8/1999 | Morman et al. |
| 5,977,390 A | 11/1999 | Raiford et al. |
| 5,981,614 A * | 11/1999 | Adiletta ..................... 521/145 |
| 5,997,981 A | 12/1999 | McCormack et al. |
| 6,015,764 A | 1/2000 | McCormack et al. |
| 6,037,281 A | 3/2000 | Mathis et al. |
| 6,063,474 A * | 5/2000 | Raiford et al. ................ 428/98 |
| 6,111,163 A | 8/2000 | McCormack et al. |
| 6,114,024 A | 9/2000 | Forte |
| 6,114,419 A | 9/2000 | Liss et al. |
| 6,127,480 A | 10/2000 | Dominguez et al. |
| 6,146,574 A | 11/2000 | Henkee et al. |
| 6,166,161 A | 12/2000 | Mullins et al. |
| 6,203,889 B1 | 3/2001 | Quincy, III et al. |
| 6,300,258 B1 | 10/2001 | Stano et al. |
| 6,309,736 B1 | 10/2001 | McCormack et al. |
| 6,350,399 B1 | 2/2002 | Cook et al. |
| 6,353,149 B1 | 3/2002 | Stone |
| 6,365,769 B1 | 4/2002 | Behr et al. |
| 6,399,700 B2 | 6/2002 | Mayes et al. |
| 6,413,621 B1 | 7/2002 | Mayes et al. |
| 6,461,133 B1 | 10/2002 | Lake et al. |
| 6,461,457 B1 | 10/2002 | Taylor et al. |
| 6,474,967 B1 | 11/2002 | Haynes et al. |
| 6,482,911 B1 | 11/2002 | Jariwala et al. |
| 6,586,522 B1 | 7/2003 | Jariwala et al. |
| 6,593,416 B2 | 7/2003 | Grootaert et al. |
| 6,608,129 B1 | 8/2003 | Koloski et al. |
| 6,613,268 B2 | 9/2003 | Haynes et al. |
| 6,613,704 B1 | 9/2003 | Arnold et al. |
| 6,613,860 B1 | 9/2003 | Dams et al. |
| 2002/0117782 A1 | 8/2002 | Clark et al. |
| 2002/0169429 A1 | 11/2002 | Li et al. |
| 2003/0162903 A1 | 8/2003 | Day |
| 2003/0175514 A1 | 9/2003 | Hancock et al. |

OTHER PUBLICATIONS

Phillips, Roger W. et al., "Application of ESCA and Contact Angle Measurements to Studies of Surface Activity in a Fluoropolymer Mixture", *Journal of Colloid and Interface Science*, vol. 56, No. 2, Aug. 1976, pp. 251-254.

* cited by examiner

SYNERGISTIC FLUOROCHEMICAL TREATMENT BLEND

BACKGROUND OF THE INVENTION

Many of the personal care products, mortuary and veterinary products, protective wear garments, and medical care garments and products in use today are partially or wholly constructed of extruded articles such as thermoplastic film materials, thermoplastic fibers and fibrous nonwoven materials, and thermoplastic foam materials. Examples of such products include, but are not limited to, medical and health care products such as surgical drapes, gowns and bandages, protective workwear garments such as coveralls and lab coats, and infant, child and adult personal care absorbent products such as diapers, training pants, disposable swimwear, incontinence garments and pads, sanitary napkins, wipes and the like. For these applications thermoplastic nonwoven fibrous webs and thermoplastic films provide tactile, comfort and aesthetic properties which can approach or even exceed those of products or garments made from traditional woven or knitted cloth materials.

Other material properties may be desirable depending on end-use applications. For example, for certain end-use applications such as protective fabrics, for instance medical products such as surgical fabrics for drapes and gowns, and fabrics for other protective garments, barrier properties are highly desirable. Further, surgical fabrics for drapes and gowns should have a high degree of repellency to low surface tension liquids such as alcohols, aldehydes, ketones and hydrophilic liquids, such as those containing surfactants, in order to more fully protect medical personnel. Repellency to low surface tension liquids is also highly desirable for protective garment fabrics such as lab coats or industrial protective workwear, for example, and for other protective cover materials designed for outdoor use such as, for example, tent fabrics, tarpaulins, car and boat covers, and the like.

In order to provide desired functional repellent properties or characteristics to products, topically applied treatments are known which may be sprayed or otherwise applied to film or fibrous material, and melt-processable additives are known which may be introduced into a thermoplastic polymeric melt and thus be extruded along with the thermoplastic polymer during the process of forming extruded articles. Many exemplary topical and melt-processable fluorochemical treatments, such as chemicals having one or more fluorinated alkyl end groups, and particularly fluorinated octane groups such as perfluorooctane, are known to provide acceptable repellency to low surface tension fluids. However, recent concerns over the possible bioaccumulative and/or bio-persistent nature of perfluorinated higher alkyl groups such as perfluorooctane compounds and perfluorodecane compounds, etc., have led to the development of fluorochemical repellency treatments comprising shorter fluorinated alkyl end groups, and particularly fluorinated butane end groups such as perfluorobutane.

However, there remains a continuing need for fluorochemical treatments, and particularly fluorochemical treatments capable of enhancing the repellency of extruded articles and materials made therefrom, at all or nearly all stages of production and use of the article or material.

SUMMARY OF THE INVENTION

The present invention provides fluorochemical blends for imparting repellency. Such fluorochemical blends are desirably capable of providing extruded articles with repellency to low surface tension fluids. The fluorochemical blends include at least a first fluorochemical which includes a majority of first fluoroaliphatic groups having 4 or fewer carbon atoms, and a second fluorochemical which includes a majority of second fluoroaliphatic groups having 6 or more carbon atoms. The aforementioned majority of first fluoroaliphatic groups may desirably be perfluorinated 4 carbon groups, and/or the majority of the second fluoroaliphatic groups may include a mixture of perfluorinated 6 carbon groups and perfluorinated 8 carbon groups, and/or the majority of the second fluoroaliphatic groups may be either perfluorinated 6 carbon groups or perfluorinated 8 carbon groups. The fluoroaliphatic groups may be linked to their respective first and second fluorochemicals by linking groups such as sulfonamide links and ethylene links.

The fluorochemical blends may comprise greater than 10 percent by weight of the first fluorochemical, and in embodiments may comprise greater than 20 percent by weight of the first fluorochemical, and in particular embodiments greater than 40 percent by weight of the first fluorochemical or even greater than 60 percent by weight of the first fluorochemical. The invention additionally provides for thermoplastic extrudable compositions which include at least one thermoplastic polymer and the fluorochemical blend. The invention further provides extruded articles, such as fibers, nonwoven webs, films and foams and the like, which include at least one thermoplastic polymer and a fluorochemical blend for imparting repellency, the fluorochemical blend including at least a first fluorochemical which includes a majority of first fluoroaliphatic groups having 4 or fewer carbon atoms, and a second fluorochemical which includes a majority of second fluoroaliphatic groups having 6 or more carbon atoms. The invention still further provides protective articles, such as medical products, protective garments and outdoor protective covers, and the like, including at least one extruded article which includes at least one thermoplastic polymer and a fluorochemical blend for imparting repellency, the fluorochemical blend including at least a first fluorochemical which includes a majority of first fluoroaliphatic groups having 4 or fewer carbon atoms, and a second fluorochemical which includes a majority of second fluoroaliphatic groups having 6 or more carbon atoms.

DETAILED DESCRIPTION OF THE INVENTION

Definitions

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein the term "monocomponent" filament refers to a filament formed from one or more extruders using only one polymer extrudate. This is not meant to exclude filaments formed from one polymer to which small amounts of additives have been added for color, anti-static properties, lubrication, hydrophilicity, etc.

As used herein the term "multicomponent filaments" refers to filaments that have been formed from at least two component polymers, or the same polymer with different properties or additives, extruded from separate extruders but spun together to form one filament. Multicomponent filaments are also sometimes referred to as conjugate filaments or bicomponent filaments, although more than two components may be used. The polymers are arranged in substantially constantly positioned distinct zones across the cross-section of the multicomponent filaments and extend continuously along the length of the multicomponent filaments. The configuration of such a multicomponent filament may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section filament, or other configurations. Multicomponent filaments are taught in U.S. Pat. No. 5,108,820 to Kaneko et al. and U.S. Pat. No. 5,336,552 to Strack et al. Conjugate fibers are also taught in U.S. Pat. No. 5,382,400 to Pike et al. and may be used to produced crimp in the fibers by using the differential rates of expansion and contraction of the two (or more) polymers. For two component filaments, the polymers may be present in ratios of 75/25, 50/50, 25/75 or any other desired ratios. In addition, any given component of a multicomponent filament may desirably comprise two or more polymers as a multiconstituent blend component.

As used herein the terms "biconstituent filament" or "multiconstituent filament" refer to a filament formed from at least two polymers, or the same polymer with different properties or additives, extruded from the same extruder as a blend. Multiconstituent filaments do not have the polymer components arranged in substantially constantly positioned distinct zones across the cross-section of the multicomponent filaments; the polymer components may form fibrils or protofibrils that start and end at random.

As used herein the terms "nonwoven web" or "nonwoven fabric" refer to a web having a structure of individual filaments or filaments that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the filament diameters useful are usually expressed in microns. (Note that to convert from osy to gsm, multiply osy by 33.91).

The terms "spunbond" or "spunbond fiber" or "spunbond fiber web" refer to a nonwoven fiber or filament material of small diameter filaments that are formed by extruding molten thermoplastic polymer as filaments from a plurality of capillaries of a spinneret. The extruded filaments are cooled while being drawn by an eductive or other well known drawing mechanism. The drawn filaments are deposited or laid onto a forming surface in a generally random manner to form a loosely entangled filament web, and then the laid filament web is subjected to a bonding process to impart physical integrity and dimensional stability. The production of spunbond fabrics is disclosed, for example, in U.S. Pat. No. 4,340,563 to Appel et al., U.S. Pat. No. 3,692,618 to Dorschner et al., and U.S. Pat. No. 3,802,817 to Matsuki et al. Typically, spunbond fibers or filaments have a weight-per-unit-length in excess of about 1 denier and up to about 6 denier or higher, although both finer and heavier spunbond filaments can be produced. In terms of filament diameter, spunbond filaments often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin, U.S. Pat. No. 4,307,143 to Meitner et al., and U.S. Pat. No. 4,707,398 to Wisneski et al., all incorporated herein by reference in their entireties. Meltblown fibers may be continuous or discontinuous, are often smaller than 10 microns in average diameter and are frequently smaller than 7 or even 5 microns in average diameter, and are generally tacky when deposited onto a collecting surface.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that is combed or otherwise treated to provide a web of generally uniform basis weight.

As used herein, "thermal point bonding" involves passing a fabric or web of fibers or other sheet layer material to be bonded between a heated calender roll and an anvil roll. The calender roll is usually, though not always, patterned on its surface in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a high density diamond or "HDD pattern", which comprises point bonds having about 460 pins per square inch (about 71 pins per square centimeter) for a bond area of about 15% to about 23% and a wire weave pattern looking as the name suggests, e.g. like a window screen. Typically, the percent bonding area varies from around 10% to around 30% or more of the area of the fabric laminate web. Another known thermal calendering bonding method is the "pattern unbonded" or "point unbonded" or "PUB" bonding as taught in U.S. Pat. No. 5,858,515 to Stokes et al., wherein continuous bonded areas define a plurality of discrete unbonded areas. Thermal bonding (point bonding or point-unbonding) imparts integrity to individual layers by bonding fibers within the layer and/or for laminates of multiple layers, such thermal bonding holds the layers together to form a cohesive laminate material.

The present invention provides fluorochemical blend compositions which are useful for imparting repellency to low surface tension fluids. The fluorochemical blend compositions are highly suitable for imparting low surface tension fluid repellency to melt extruded articles such as for example fibers, nonwoven fibrous webs, films and foams. The fluorochemical blends include at least first and second fluorochemicals, each having fluoroaliphatic groups. The majority of the fluoroaliphatic groups of the first fluorochemical have 4 or fewer carbon atoms, and the majority of the fluoroaliphatic groups of the second fluorochemical have 6 or more carbon atoms. By "majority" what is meant is that more than half of the fluoroaliphatic groups in the first fluorochemical have 4 or fewer carbon atoms, and more than half of the fluoroaliphatic groups in the second fluorochemical have 6 or more carbon atoms. With respect to the fluoroaliphatic groups, for either the first fluorochemical or the second fluorochemical, these may be either straight chain groups or branched groups.

As stated, the inventive fluorochemical blends comprise at least two fluorochemicals, where the first fluorochemical comprises a majority of first fluoroaliphatic groups having 4 or fewer carbon atoms and the second fluorochemical comprises a majority of second fluoroaliphatic groups having 6 or more carbon atoms. More particularly, the majority of the first fluoroaliphatic groups may be a fluorobutane group, and still more particularly a perfluorobutane group, that is, a fluorobutane group which is fully fluorinated, i.e. F9C4. The majority of the first fluoroaliphatic groups may also comprise a mixture of 3 carbon and 4 carbon groups wherein the mixture in sum represents a majority of the first fluoroaliphatic groups.

Further, because part of the function of the first fluorochemical is to provide repellency while reducing use of higher fluoroaliphatic groups (as used here, fluoroaliphatic groups having 6 carbons, and longer), it is desirable for the first fluorochemical to comprise 60 percent or more of first fluoroaliphatic groups having 4 or fewer carbons. More desirably, the first fluorochemical may comprise 70 percent or more of first fluoroaliphatic groups having 4 or fewer carbons, and still more desirably the first fluorochemical may comprise 80 percent or even 90 percent or more of first fluoroaliphatic groups having 4 or fewer carbon atoms. Furthermore, in some cases, the first fluorochemical may comprise essentially 100 percent of fluoroaliphatic groups as a single moiety, such as perfluorobutane.

As stated above, the second fluorochemical comprises a majority of second fluoroaliphatic groups having 6 or more carbon atoms. Typically, these higher fluoroaliphatic groups will have from 6 to about 20 carbon atoms, and more generally from 6 to about 14 carbon atoms. More particularly, the majority of the second fluoroaliphatic groups may be fluorohexane or fluorooctane groups, and still more particularly perfluorinated higher aliphatic groups such as perfluorohexane groups (F13C6) and perfluorooctane groups (F17C8). The second fluoroaliphatic groups may also be present as a mixture of two or more higher fluoroaliphatic groups wherein the mixture in sum represents a majority of the second fluoroaliphatic groups.

Fluorochemical repellents and particularly fluorochemicals comprising perfluorinated aliphatic groups are well known in the art. Fluorochemicals can be produced using a telomer chemistry process, which generally use an alkyl linking group such as an ethylene linking group (—C2H4-) between the fluoroaliphatic group and the hydrocarbon chain making up the remainder of the fluorochemical or fluoropolymer. Telomer chemistry processes are known to produce fluorochemicals having a distribution of fluoroaliphatic group lengths. For example, a single run or batch of such a process may produce fluorochemicals having perfluorohexane groups, perfluorooctane groups, perfluorodecane groups, etc., often with the majority of the fluoroaliphatic groups being perfluorooctane groups. Exemplary fluorochemicals are disclosed, for example, in U.S. Pat. No. 5,681,963 to Liss, U.S. Pat. No. 5,789,491 to Liss et al., and U.S. Pat. No. 5,898,046 to Raiford et al., all incorporated herein by reference in their entireties. Suitable fluorochemicals are available from the E.I. du Pont de Nemours and Company of Wilmington, Del. and sold under the brand name ZONYL®, and available from Daikin America, Inc. of Orangeburg, N.Y., under the trade name UNIDYNE.

Other fluorochemicals are known to be produced by electrochemical processes, such as the fluorochemical repellents disclosed in U.S. Pat. No. 5,025,052 to Crater et al., incorporated herein by reference in its entirety. Electrochemically produced fluorochemicals typically have a sulfonamide linking group (—S(O2)N(R)—) between the fluoroaliphatic group and the hydrocarbon chain making up the remainder of the fluorochemical or fluoropolymer, although other linking groups, and particularly hetero atom containing groups such as —O—, —S—, —SO—, etc. may be used. Electrochemical production processes generally result in essentially a non-distribution of fluoroaliphatic groups, i.e. a single moiety of the fluoroaliphatic groups linked to the hydrocarbon chain, such as for example (where the linking group is a sulfonamide group) a perfluorobutanesulfonamide group or a perfluorooctanesulfonamide.

Although either of the first fluorochemical or the second fluorochemical by itself is capable of imparting repellency to low surface tension fluids, neither fluorochemical alone imparts adequate repellency at all stages of the production and use life cycle of many of the desirable extruded articles described herein. For example, fluorochemicals comprising the higher fluoroaliphatic groups may produce poorer initial repellency in extruded articles, and thus may require either or both of heating the extruded article or a substantial aging term during which the fluorochemical can "bloom" or migrate to the surfaces of the extruded article. Prior to such migration, the repellency of the extruded article is typically much lower than the level of repellency after heat blooming and/or aging. See, for example, U.S. Pat. No. 6,203,889 to Quincy, III et al., which describes selective application of heat for improved migration of the additives in the selected heated portions.

On the other hand, extruded articles comprising fluorochemical compounds with substantially only lower fluoroaliphatic groups may produce adequate initial repellency. However, we have observed that such articles exhibit nearly the opposite effect upon exposure to heat, and for a substantial period after exposure to heat, in that the repellency decreases substantially. When such a fluorochemical having lower fluoroaliphatic groups is to be used for extruded articles, this effect can be problematic because extruded articles are often exposed to momentary (and longer) heating after their formation during such processing operations as thermal bonding, drying of applied liquid treatments by heating as with heated air or steam canisters, and heat sterilization.

Desirably, to reduce the usage of the amount of fluorochemical with higher fluoroaliphatic groups, it is desirable that the fluorochemical blends comprise at least about 20 percent by weight of the blend of the first fluorochemical, and more desirable that the fluorochemical blends comprise at least about 40 percent by weight of the blend of the first fluorochemical. Depending on the balance between end-use need, amount and type and timing of desired repellency, and desired reduction in use of higher fluoroaliphatic group-containing fluorochemicals, it may be desirable for the fluorochemical blends to comprise at least about 50 percent by weight of the blend of the first fluorochemical, or even at least about 60 percent, 70 percent, 80 percent or more of the first fluorochemical.

Fluorochemicals used to impart repellency are known to be applied topically to the surface of the article for which repellency is desired. However, the fluorochemical blends herein may be particularly suited for use as an internal additive, such as by adding to a polymeric composition prior to extruding the composition into or as an extruded article. Where the fluorochemical blends are used as internal melt additives in a thermoplastic polymer melt composition, they may be added in an amount from greater than 0% by weight of the thermoplastic polymer melt composition up to about 5% by weight. More particularly, the fluorochemical blends may be added in an amount from about 0.1% to about 4% by weight of the thermoplastic polymer melt, and still more particularly in an amount from about 0.25% to about 2.5% by weight of the thermoplastic polymer melt composition.

The repellent fluorochemical blends may be beneficially utilized to produce repellency to low surface tension fluids such as alcohols, aldehydes, ketones and surfactant-containing or other hydrophilic liquids, in melt extruded articles such as fibers, nonwoven fibrous webs, films and foams. Such extruded articles, when intended for use in personal care products, protective wear garments, and medical products and garments, are especially useful in the form of various films and various melt spun fibers and nonwoven webs, and laminates thereof, as are known in the art. Repellent extruded articles in the form of films or fibers may also desirably be utilized in textile fabrics, carpeting, and the like.

As stated, the fluorochemical blends are highly useful in imparting repellency in extruded thermoplastic articles in the form of fibers, such as meltblown fibers or spunbond fibers, or in the form of various thermoplastic films. Processes for the formation of meltblown fibers and meltblown fiber nonwoven webs are well known in the art and will not be described in detail herein. As mentioned above, processes for producing meltblown are disclosed, for example, in U.S. Pat. No. 3,849,241 to Buntin, U.S. Pat. No. 4,307,143 to Meitner et al., and U.S. Pat. No. 4,707,398 to Wisneski et al., all incorporated herein by reference in their entireties. Meltblown fiber layers are very useful for providing a layer having a certain resistance to the passage of liquids, and therefore acting as a liquid barrier layer or partial liquid barrier layer, while still allowing gases and vapors, such as air and water vapor to pass through and thereby improving skin comfort. In this way a meltblown fiber layer may be utilized to provide a breathable liquid barrier layer.

Where the extruded article is desired to be in the form of meltblown fibers, it is highly desirable to utilize a polymer having a high melt flow rate. Exemplary high melt flow rate polymers include those provided by adding a prodegradant such as a peroxide to conventionally produced polymers such as those made by Ziegler-Natta catalysts in order to partially degrade the polymer to increase the melt flow rate and/or narrow the molecular weight distribution. Peroxide addition to polymer pellets is described in U.S. Pat. No. 4,451,589 to Morman et al. and improved barrier microfiber nonwoven webs which incorporate peroxides in the polymer are disclosed in U.S. Pat. No. 5,213,881 to Timmons et al.

In addition to the peroxidated or peroxide-degraded polymers described above, high melt flow rate polymers are known which as-polymerized comprise polymers having a narrow molecular weight distribution and/or low polydispersity (relative to conventional olefin polymers such as those made by Ziegler-Natta catalysts) and include those catalyzed by "metallocene catalysts", "single-site catalysts", "constrained geometry catalysts" and/or other like catalysts. These types of polymers are also highly suited to producing extruded articles comprising meltblown type fibers. Examples of such catalysts and/or olefin polymers made therefrom are described in, by way of example only, U.S. Pat. No. 5,153,157 to Canich, U.S. Pat. No. 5,064,802 to Stevens et al., U.S. Pat. No. 5,374,696 to Rosen et al., U.S. Pat. No. 5,451,450 to Elderly et al., U.S. Pat. No. 5,204,429 to Kaminsky et al., U.S. Pat. No. 5,539,124 to Etherton et al., U.S. Pat. Nos. 5,278,272 and 5,272,236, both to Lai et al., U.S. Pat. No. 5,554,775 to Krishnamurti et al. and U.S. Pat. No. 5,539,124 to Etherton et al. Exemplary polymers having a high melt flow rate, narrow molecular weight distribution and low polydispersity are disclosed in U.S. Pat. No. 5,736,465 to Stahl et al. and are available from ExxonMobil Chemical Company of Houston, Tex. under the trade name ACHIEVE.

Processes for the formation of spunbond fibers and spunbond nonwoven webs are well known in the art and also will not be described in detail herein. As mentioned above, processes for producing spunbond fibers and spunbond fiber fabrics is disclosed, for example, in U.S. Pat. No. 4,340,563 to Appel et al., U.S. Pat. No. 3,802,817 to Matsuki et al. and U.S. Pat. No. 3,692,618 to Dorschner et al., all incorporated herein by reference in their entireties. In addition, the fluorochemical blends may be useful in one or more layers of composite or laminate web materials, and processes for the formation of spunbond-meltblown laminate materials and spunbond-meltblown-spunbond are disclosed in disclosed in U.S. Pat. No. 4,041,203 to Brock et al., U.S. Pat. No. 5,169,706 to Collier, et al. and U.S. Pat. No. 4,374,888 to Bornslaeger, all incorporated herein by reference in their entireties.

Various thermoplastic films and processes for forming them are known in the art. For example, microporous breathable films contain a filler material, such as for example calcium carbonate particles, in an amount usually from about 30 percent to 70 percent by weight of the film. The filler-containing film (or "filled film") is then stretched or oriented to open micro-voids around the filler particles in the film, which micro-voids allow for the passage of air and water vapor through the film. Exemplary breathable films and film-nonwoven laminate materials are described in, for example, U.S. Pat. No. 6,114,024 to Forte, U.S. Pat. No. 6,309,736 to McCormack et al, and U.S. Pat. No. 6,037,281 to Mathis et al., all incorporated herein by reference in their entireties. In addition, breathable microporous elastic films containing fillers are described in, for example, U.S. Pat. Nos. 6,015,764 and 6,111,163 to McCormack and Haffner, U.S. Pat. No. 5,932,497 to Morman and Milicevic, and in U.S. Pat. No. 6,461,457 to Taylor and Martin, all incorporated herein by reference in their entireties.

As stated, desirable extruded articles may include multi-component extruded thermoplastic articles and comprise multicomponent fibers. In this regard, it may be possible to reduce the amount of fluorochemical blend required to produce the desired repellent effects by either using the fluorochemical blend in less than all of the components, or by using the fluorochemical blend in all components but using decreased concentrations in one or more of the components. Bicomponent and multicomponent fiber production processes are known in the art. For example, U.S. Pat. No. 5,382,400 to Pike et al., incorporated herein by reference in its entirety, discloses a suitable process for producing multicomponent fibers and webs thereof. Also, multicomponent microfibers such as bicomponent or multicomponent melt-blown microfibers are known in the art and may desirably be utilized. Multicomponent fibers in meltblowing production processes are described in U.S. Pat. No. 6,461,133 to Lake et al. and U.S. Pat. No. 6,474,967 to Haynes et al., both incorporated herein by reference in their entireties.

The geometric configuration or arrangement of the components of such multicomponent fibers may be, for example, a concentric or eccentric sheath-core arrangement wherein one polymer is surrounded by another, or may be in a side by side arrangement, or an "islands-in-the-sea" arrangement, or arranged as pie-wedge shapes, hollow pie-wedges, or as stripes on a round, oval or rectangular cross-section filament, or other configurations. However, at least one surface-facing geometric component should desirably comprise the fluorochemical blend. That is, because it is necessary for fluorochemical blend to be able to reach the surface of the extruded article to be effective, if the only fluorochemical blend-containing component of the multicomponent extruded article is a non-surface facing component (such as a core component in a sheath-core configuration, or island components in an islands-in-the-sea arrangement), the repellent effects of the fluorochemical blend would be decreased.

As stated, a multicomponent extruded thermoplastic article may also desirably be a multilayer film. A multilayer film may be constructed to have one or more core components and one or more "skin" or thin outer layer components, and any or all of the layers or components may desirably comprise the fluorochemical blend. Alternatively, it may be desirable to have only one or more of the skin layer components comprise the fluorochemical blend, in order to reduce the overall amount of the blend required to provide the desired repellent properties to the film. Where a multilayer film is to be a stretched-thinned film or a filled breathable film stretched to impart breathability, it may be desirable to have a core layer of the multilayer film comprise the fluorochemical blend, with or without fluorochemical blend-containing skin layers. Exemplary multilayer films such as are disclosed in U.S. Pat. Nos. 5,997,981 and 6,309,736 to McCormack et al., U.S. Pat. No. 6,114,024 to Forte and U.S. Pat. No. 6,037,281 to Mathis et al., all incorporated herein by reference in their entireties, may be useful.

Generally speaking, in order to effectively incorporate a melt processable additive into the thermoplastic polymeric composition, melt additives such as the inventive fluorochemical blends may be mixed, prior to extrusion, directly such as by dry blending with a thermoplastic polymer or polymers to be extruded and thereafter melt-processing the additive-polymer mixture to produce the film or fibers of the extruded article. Where multicomponent fibers or multilayer films are desired, an additive-polymer mixture may desirably be used as one or more of the components of the multicomponent fiber or one or more of the layers of the multilayer film.

Alternatively, for ease of incorporating melt additives such as the inventive fluorochemical blends, melt additives may be compounded with a base of one or more polymers. For example, the fluorochemical blend may be compounded into an additive-polymer compound as a "masterbatch" or "concentrate" at (for example) a 20 percent by weight loading level. Then, during the production of a desired extruded article, if the 20 percent additive-polymer concentrate is added to the other virgin polymer or polymers to be extruded at a rate of 5 kilograms of additive-polymer compound to 95 kilograms of virgin polymer, the resulting extruded article contains 1 percent by weight of the melt additive. In addition, where it is desired to incorporate the fluorochemical blend in an extruded article via use of masterbatch or concentrate addition, it should be noted that it may be more desirable to produce individual masterbatches or concentrates which separately comprise the individual fluorochemicals to be used in the fluorochemical blend. As an example, one concentrate may be made including the first fluorochemical having a majority of the lower fluoroaliphatic groups (4 or fewer carbon), and a second concentrate including the second fluorochemical having a majority of the higher fluoroaliphatic groups (6 or greater carbon).

Polymers known to be generally suitable for melt extrusion of fibers and films include polyolefins, polyesters, polyamides, polycarbonates and copolymers and blends thereof. Suitable polyolefins include polypropylene, e.g., isotactic polypropylene, syndiotactic polypropylene, blends of isotactic polypropylene and atactic polypropylene; polyethylene, e.g., high density polyethylene, medium density polyethylene, low density polyethylene and linear low density polyethylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, poly-butylene terephthalate, polytetramethylene terephthalate, polycyclohexylene-1,4-dimethylene terephthalate, and isophthalate copolymers thereof, as well as blends thereof. Selection of polymers for fibers and/or films is guided by end-use need, economics, and processability. The list of suitable polymers herein is not exhaustive and other polymers known to one of ordinary skill in the art may be employed.

In addition, it may be desirable that one or more of the polymers used is an elastomeric polymer. Many elastomeric polymers are known to be suitable for forming fibers, foams and films. Elastic polymers useful may be any suitable elastomeric fiber or film forming resin including, for example, elastic polyesters, elastic polyurethanes, elastic polyamides, elastic co-polymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and where B is an elastomeric polymer midblock such as a conjugated diene or a lower alkene polymer such as for example polystyrene-poly(ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly(ethylene-propylene) or SEPSEP block copolymer. These A-B-A' and A-B-A-B copolymers are available in several different formulations from Kraton Polymers US, LLC of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from ExxonMobil Chemical Company of Houston, Tex., as well as blends.

EXAMPLES

Comparative and Example repellent fluorochemical-containing extruded articles were produced as meltblown and spunbond nonwoven web materials. Except for Comparative 2 and Comparative 4, all of the Comparative and Example materials contained a 4-carbon group (perfluorobutane group) fluorochemical received from the 3M Company of St. Paul, Minn. and designated L-18866 by its manufacturer. The L-18866 fluorochemical is believed to be an electrochemically produced fluorochemical having a sulfonamide linking group between the perfluorobutane group and the hydrocarbon chain.

The spunbond and meltblown Example and Comparative materials, except for Comparative 1 and Comparative 3, additionally contained UNIDYNE TG-180, an internal melt additive fluorochemical composition commercially available from Daikin America, Inc. of Orangeburg, N.Y. UNIDYNE TG-180 is a telomer-based fluoroalkyl acrylate fluorochemical comprising a majority of perfluorooctane groups. In addition, a sample each of spunbond and meltblown was produced without any repellency fluorochemical treatments, for a "control" or baseline of the repellency testing.

The meltblown webs were produced by extruding a polymer composition at a melt temperature of about 540° F. (282° C.) through a meltblowing die at a throughput of about 2 pounds per inch per hour (about 36 kg/meter/hour), attenuating the fibers using primary air at a temperature of about 540° F. (282° C.), and collecting the meltblown fibers into a meltblown web on a foraminous forming surface. The meltblown webs were all about 0.5 osy (about 17 gsm) in basis weight. The majority polymer in the extruded polymer composition of all of the meltblown webs was 3746G polypropylene, a meltblown grade polymer commercially available from ExxonMobil Chemical Company of Houston, Tex. Each also contained about 10 percent by weight of DP-8911 polybutylene, an ethylene copolymer of 1-butene having about 5% ethylene which is commercially available from Basell, USA, Inc. of Wilmington, Del. The weight composition of each of the meltblown webs is shown below in TABLE 1, including weight additive of the two fluorochemical compositions. In addition, all of the meltblown materials comprised about 2 weight percent of a blue pigment concentrate, designated SCC-11115 and commercially available from the Standridge Color Corp. of Social Circle, Ga.

TABLE 1

| Sample | 3746G | DP-8911 | L-18866 | TG-180 | SCC-11115 |
|---|---|---|---|---|---|
| MB Control | 88.0% | 10% | 0.0% | 0.0% | 2% |
| Comparative 1 | 86.8% | 10% | 1.2% | 0.0% | 2% |
| Comparative 2 | 86.8% | 10% | 0.0% | 1.2% | 2% |
| Example 1 | 86.8% | 10% | 0.8% | 0.4% | 2% |
| Example 2 | 86.8% | 10% | 0.6% | 0.6% | 2% |
| Example 3 | 86.8% | 10% | 0.4% | 0.8% | 2% |

The spunbond webs were produced by extruding a polymer composition including a base polymer, a random copolymer of ethylene in propylene designated 6D43 and commercially available from Basell, USA, Inc. of Wilmington, Del. The spunbond materials further comprised the fluorochemical compositions and two color concentrates, white pigment (TiO2) designated SCC-4837 and blue pigment designated SCC-11111 (both commercially available from the Standridge Color Corporation, Social Circle, Ga.) in the weight percentages shown in TABLE 2 below. All of the spunbond webs had basis weights of about 0.75 osy (about 26 gsm).

TABLE 2

| Sample | 6D43 | L-18866 | TG-180 | SCC-4837 | SCC-11111 |
|---|---|---|---|---|---|
| SB Control | 97.6% | 0% | 0% | 2% | 0.4% |
| Comparative 3 | 97.2% | 0.4% | 0% | 2% | 0.4% |
| Comparative 4 | 97.2% | 0% | 0.4% | 2% | 0.4% |
| Example 4 | 97.2% | 0.2% | 0.2% | 2% | 0.4% |
| Example 5 | 97.0% | 0.4% | 0.2% | 2% | 0.4% |
| Example 6 | 97.0% | 0.2% | 0.4% | 2% | 0.4% |

Repellency Testing:

The repellency of the nonwoven materials to low surface tension fluids was tested by determining the materials' repellency to a series of solutions of isopropyl alcohol in water. Drops of the isopropyl alcohol/water solutions were placed on the surfaces of the materials. The solutions contained isopropyl alcohol at volumetric concentrations in water of 20%, 30%, 40%, 50%, 60%, 70%, 80%, 90% and 99%. As the level of isopropyl alcohol in the solution is increased, the solution surface tension decreases and it becomes more difficult for a given material to effectively repel the solution. As a reference point, 100% isopropyl alcohol has a surface tension of about 22 dynes/cm.

To perform the test, eight drops of each isopropyl alcohol/water solution were placed along the cross machine direction of the meltblown material or spunbond material being tested. After five minutes, a repellency rating was given. The repellency rating number was the solution with the highest percentage isopropyl alcohol that did not wet the material surface. The back of each material was observed to determine if the material was wetted through by the isopropyl alcohol solution. If one or more of the eight drops of an isopropyl alcohol solution wetted the material, then the material was failed at that level.

In some cases, a rating between increments of 10% isopropyl alcohol was given. For example, a rating of 85% isopropyl alcohol indicates that the material easily repelled 80% isopropyl alcohol but only a drop or two of the eight drops of 90% isopropyl alcohol just slightly wetted the material. For control purposes, the non-treated baseline spunbond and meltblown materials were also tested for repellency and both of these baseline materials passed only 20% isopropyl alcohol.

The material samples were tested at various times and under various conditions to simulate the production life cycle for protective and medical articles such as may be produced using repellent spunbond and meltblown materials. The materials were tested for repellency just following formation into a web material ("In-process" designation in TABLES 3-5), following heat exposure to the just-produced samples ("Heat" designation in TABLES 3-5), after allowing the samples to age for various times as indicated, and after heating of aged samples. Where the samples were heated, heating took place either in a heated oven or via contact heat of the sample against a curved, Teflon-coated heated metal plate. The particular type of heat method and temperature is noted in the table entries. The results of the repellency testing for the meltblown material samples is shown below in TABLE 3, while the results of the repellency testing for the spunbond material samples is shown below in TABLE 4 and in TABLE 5. The notation "--" for a test condition entry indicates that a sample was not tested at that particular condition.

TABLE 3

| Sample | In-process | Aged > 2.5 hours | 24 hours | 1 week | 1 month | Heat[A] | >3 hours after heat[A] |
|---|---|---|---|---|---|---|---|
| MB Control | 20 | — | 20 | 20 | 20 | 20 | — |
| Comparative 1 | 75 | 80 | 80 | 80 | 80 | 40 | — |

TABLE 3-continued

| Sample | In-process | Aged > 2.5 hours | 24 hours | 1 week | 1 month | Heat[A] | >3 hours after heat[A] |
|---|---|---|---|---|---|---|---|
| Comparative 2 | 30 | 30 | 30 | 30 | 35 | 80 | 80 |
| Example 1 | 50 | 70 | 75 | 80 | 80 | 70 | 80 |
| Example 2 | 40 | 50 | 65 | 65 | 80 | 70 | 85 |
| Example 3 | 35 | 40 | 40 | 50 | 60 | 75 | 80 |

[A]2 minutes in oven heated at 110° C.

As can be seen from TABLE 3, the meltblown control material was only positive for repellency to isopropyl alcohol at a 20% concentration in water. The comparative meltblown sample Comparative 1 demonstrated good initial or "in-process" repellency to isopropyl alcohol and after various aging times. However, immediately following exposure to heat at 110° C., the repellency level of Comparative 1 dropped sharply from a rating of 75% isopropyl alcohol down to a rating of 40% isopropyl alcohol. Comparative 2 meltblown sample demonstrated good repellency at a rating of 80% isopropyl alcohol both immediately following exposure to heat at 110° C. and 3 hours later, but, absent of heat exposure, it demonstrated poorer repellency initially and for all aging periods tested. However, it can be seen in TABLE 3 that the Example meltblown materials Examples 1-3 demonstrate initial repellency ratings that are higher than the MB control and Comparative 2, and (in contrast to Comparative 2) the repellency ratings of the Example meltblown materials improves with aging. In addition, and of more importance, in contrast to Comparative 1 meltblown sample, the Example meltblown materials demonstrate improved repellency ratings after exposure to heat, rather than decreased repellency ratings.

TABLE 4

| Sample | In-process | Heat[B] | Contact heat[C] | Aged > 4 hours | Aged > 4 hours + heat[A] | Aged 24 hours | Aged 24 hours + heat[A] |
|---|---|---|---|---|---|---|---|
| SB Control | 20 | — | 20 | — | — | — | — |
| Comparative 3 | 25 | 40 | 30 | 45 | 40 | 50 | 40 |
| Comparative 4 | 30 | 80 | 70 | 30 | 65 | 30 | 80 |
| Example 4 | 30 | 85 | 75 | 40 | 80 | 50 | 80 |
| Example 5 | 30 | 80 | 60 | 70 | 85 | 75 | 85 |
| Example 6 | 40 | 85 | 45 | 55 | 90 | 50 | 90 |

[A]2 minutes in oven heated at 110° C.
[B]1 minute in oven heated at 107° C.
[C]7 seconds contact at approximately 105° C. to simulate steam canister contact.

TABLE 5

| Sample | Aged 4 days | Aged 7 days | Aged 7 days + heat[A] | Aged 7 days + heat[A] + aged 14 days | Aged 3 weeks |
|---|---|---|---|---|---|
| SB Control | — | 20 | 20 | — | 20 |
| Comparative 3 | 45 | 60 | 35 | 90 | 85 |
| Comparative 4 | 30 | 30 | 75 | 70 | 30 |
| Example 4 | 35 | 45 | 80 | 95 | 50 |
| Example 5 | 85 | 85 | 85 | 95 | 90 |
| Example 6 | 55 | 55 | 85 | 95 | 65 |

[A]2 minutes in oven heated at 110° C.

TABLES 4 and 5 show the results of the spunbond material samples. The spunbond control showed repellency to isopropyl alcohol only at a 20% concentration in water. The comparative spunbond sample Comparative 3 demonstrated low initial or "in-process" repellency to isopropyl alcohol at a 25% rating. This repellency improved with aging, reaching 50% and 60% at 24 hours and 7 days, respectively. However, immediately following exposure to heat at 110° C., the repellency level of Comparative 3 dropped sharply from a rating of 50% to 40% at the 24 hour aging time, and from 60% to 35% at the 7 day aging time. Comparative 4 spunbond sample demonstrated good repellency rating for testing times following exposure to heat, but absent of heat exposure, it demonstrated poorer repellency for all aging periods tested, never attaining repellency to any concentration of isopropyl alcohol higher than 30%. In contrast to the Comparative 3 and Comparative 4 spunbond materials, the Example spunbond materials Examples 4-6 demonstrate repellency ratings which continue to increase with aging even without exposure to heat, and which also increase more quickly with the application of heat.

While not wishing to be bound by theory, we believe that the fluorochemical comprising shorter fluoroaliphatic functional groups such as perfluorobutane, having a smaller moiety, more easily migrates to the surface of an extruded article and is thus capable of presenting an extruded article with repellency to low surface tension fluids without the requirement of heat blooming or aging. However, this facile migration may also allow for the fluorochemical containing the shorter fluoroaliphatic functional groups to temporarily migrate away from the surface when exposed to heat, i.e. into the extruded article, causing a decrease in low surface tension fluid repellency for a period of time following the heat exposure. Therefore, use of the fluorochemical having the shorter fluoroaliphatic groups in combination with a second fluorochemical having the longer fluoroaliphatic groups (which tend to surface segregate upon the application of blooming heat), can thus give an extruded article the desired functional surface properties (i.e., repellency to low surface tension fluids) immediately after production of the extruded article, after the article has been exposed to heat, and upon aging.

Although the Examples relate to the inventive blend composition as melt processable additive treatments, we believe the invention may also be applicable and beneficially used more generally, such as for example using the blend composition as a topical repellent treatment which is applied onto an article by methods known in the art such as by spraying, dipping, foaming and the like.

Figure 1:
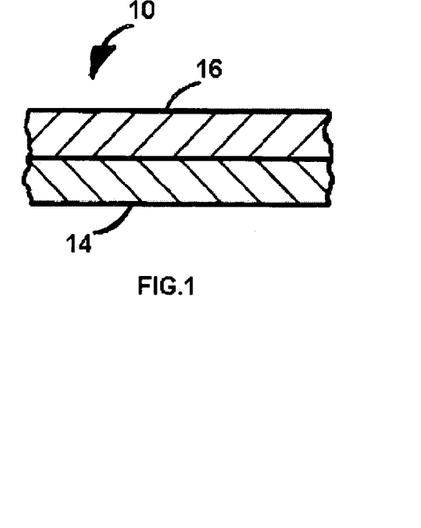
FIG. 1 is a schematic illustration of an embodiment of a protective material which may be formed utilizing the fluorochemical blends of the present invention.

As stated, the fluorochemical blends may desirably be incorporated into extruded thermoplastic articles or materials such as fibrous nonwoven webs, thermoplastic foams and thermoplastic films as are known in the art. It may also be desirable to produce laminates or composite materials comprising two or more layers of such materials, where at least one material comprises the repellent fluorochemical blend. The individual layers of such laminates or composites may be bonded together by methods known in the art such as mechanical entangling, hydroentangling, adhesive bonding, ultrasonic bonding, and thermal bonding methods. An exemplary bi-layer laminate material comprising such extruded thermoplastic articles is shown in side-view in FIG. 1. As shown in FIG. 1, the bi-layer laminate material is generally designated 10 and comprises a first layer 14 and second layer 16. Either or both of the first and second layers (14, 16) may desirably comprise materials such as films, spunbond and meltblown fibrous webs, etc. which comprise the repellent fluorochemical blends of the invention. Particularly useful laminate constructions include spunbond-spunbond laminates, spunbond-film laminates and spunbond-meltblown laminates.

Figure 2:
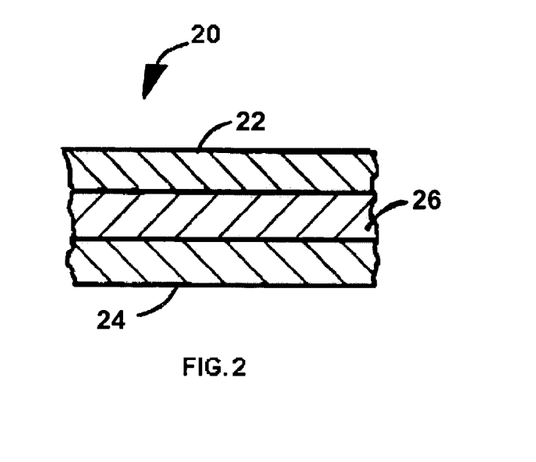
FIG. 2 is a schematic illustration of another embodiment of a protective material which may be formed utilizing the fluorochemical blends of the present invention.
Figure 3:
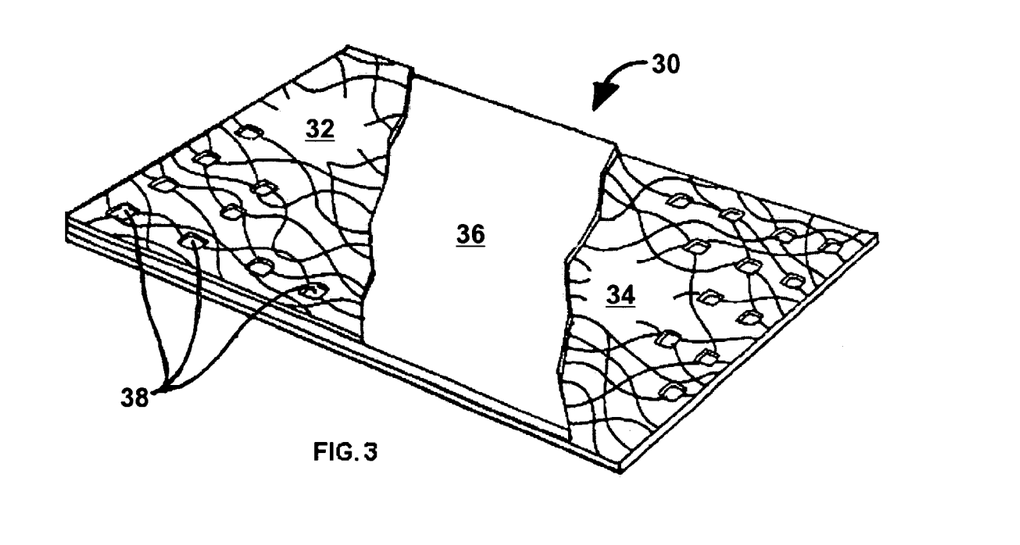
FIG. 3 is a partially cut-away perspective view of another protective material which may be formed utilizing the fluorochemical blends of the present invention.

FIG. 2 and FIG. 3 illustrate exemplary tri-layer laminate materials which may desirably be constructed using extruded thermoplastic articles or materials, one or more of the materials containing the repellent fluorochemical blends of the invention. In FIG. 2 the tri-layer laminate material, generally designated 20, is shown in side-view and comprises a first outer layer 22 and a second outer layer 24 with an inner layer 26 sandwiched therebetween. FIG. 3 illustrates another tri-layer laminate material shown in a partially cut-away view showing an inner layer 36 sandwiched between a first outer layer 32 and a second outer layer 34. As shown in FIG. 3, the outer layers 32 and 34 may be fibrous layers such as spunbond or meltblown fibrous layers. Additionally shown in FIG. 3 are exemplary bond points 38 such as may be made by a thermal point bonding process. As discussed above and depending on end-use needs for the composite or laminate material, any of the first and second outer layers or the inner layer as are shown in FIG. 2 or FIG. 3 may desirably comprise extruded thermoplastic articles such as films, spunbond or meltblown fibrous webs, etc. which comprise the repellent blends of the invention.

An example of a multilayer laminate material comprising one or more meltblown fiber web layers and spunbond fiber web layers is an embodiment such as a spunbond-meltblown-spunbond (SMS) laminate as disclosed in U.S. Pat. No. 4,041,203 to Brock et al., U.S. Pat. No. 5,169,706 to Collier, et al. and U.S. Pat. No. 4,374,888 to Bornslaeger, all incorporated herein by reference in their entireties. Such a SMS laminate may be made by sequentially depositing onto a moving forming belt first a spunbond fiber nonwoven web layer, then one or more meltblown fiber web layers followed by another spunbond fiber layer, and then bonding the laminate together by thermal point bonding, adhesive bonding or ultrasonic bonding or by other means as known in the art. In such an SMS laminate material, any or all of the material layers may desirably comprise the repellent fluorochemical blends. In addition, where more than one layer comprises the fluorochemical blend, one layer may comprise the blend in a concentration differing from that in another layer. Furthermore, one layer may comprise a fluorochemical blend that is different from the fluorochemical blend in another layer.

Figure 4:
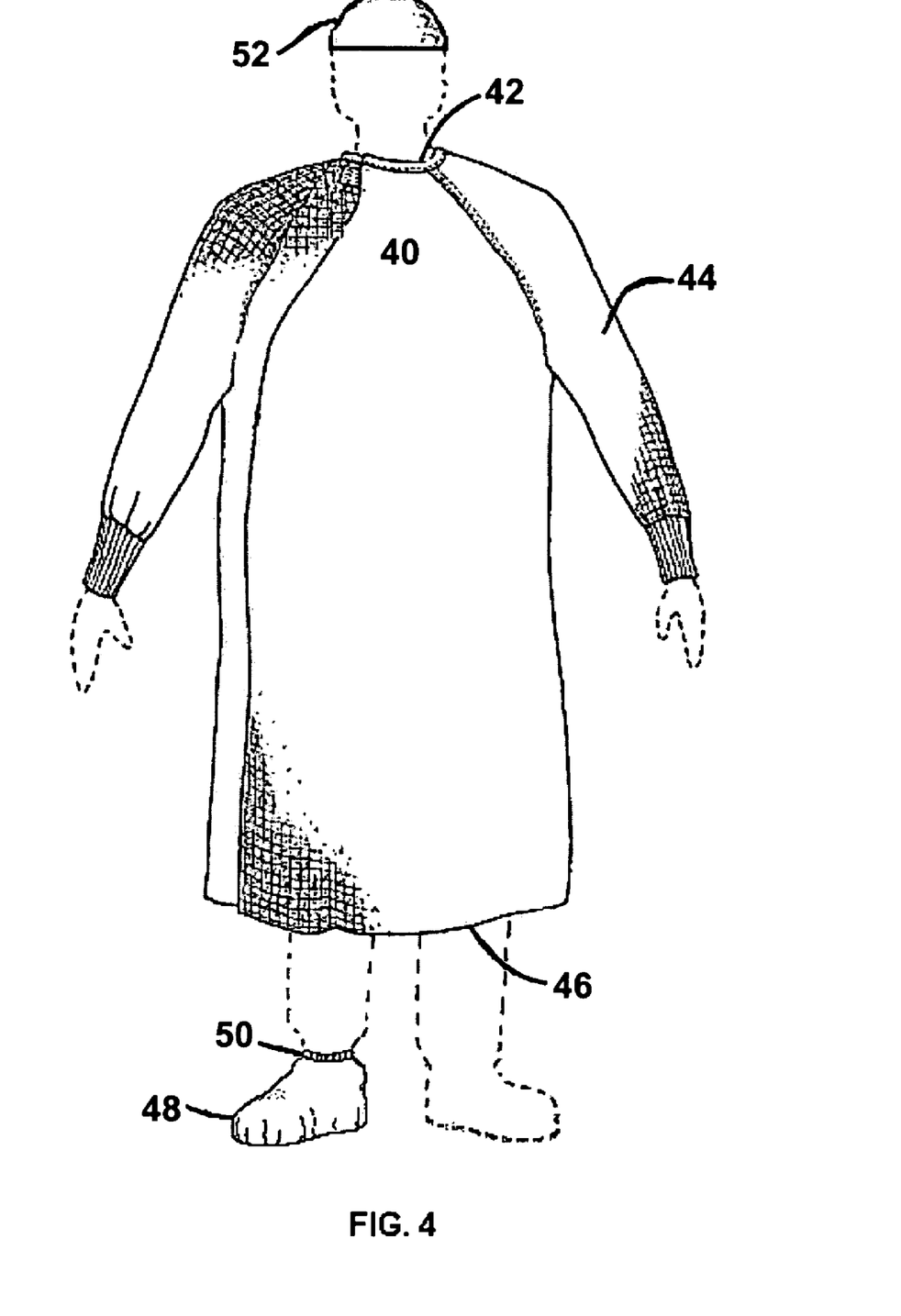
FIG. 4 is a schematic illustration of various medical products fabricated utilizing materials comprising the fluorochemical blends of the present invention.

The extruded articles mentioned above such as films, foams and fibrous webs comprising the repellent fluorochemical blends of the invention are highly suitable for various uses, for example, uses including infant, child and adult personal care absorbent products where low surface tension fluid repellency is desired. In addition, articles or materials comprising the repellent fluorochemical blends are particularly suitable for use in disposable protective articles such as protective fabrics, fabrics for medical products such as patient gowns, sterilization wraps and surgical drapes, gowns, head and shoe coverings, face masks, and fabrics for other protective garments such as industrial workwear. Exemplary medical products are shown schematically in FIG. 4 on a human outline represented by dashed lines. As illustrated in FIG. 4, gown 40 is a loose fitting garment including neck opening 42, sleeves 44, and bottom opening 46. Gown 40 may be fabricated using films and/or nonwoven webs or laminates wherein at least one material layer comprises the fluorochemical blends of the invention. Also shown on the human outline in FIG. 4 is shoe covering 48 having opening 50 which allows the cover to fit over the foot and/or shoe of a wearer. Shoe covering 48 may be fabricated using films and/or nonwoven webs or laminates wherein at least one material layer comprises the fluorochemical blends of the invention. Additionally shown in FIG. 4 is head covering 52, such as a surgical cap, which may also be fabricated using films and/or nonwoven webs or laminates comprising the fluorochemical blends of the invention.

Various additional finishes, additives, and/or potential processing steps known in the art may desirably be performed on extruded articles such as films and fibrous webs, etc., and will not be described herein in detail. Briefly, examples include such as aperturing, slitting, stretching or treating of material layers. In addition, treatment to provide antistatic properties may be highly desirable where the desired end-use of the fluorochemical blend containing article is as a medical protective fabric. Antistatic treatments may be applied topically by spraying, dipping, etc., and an exemplary topical antistatic treatment is a 50% solution of potassium N-butyl phosphate available from the Stepan Company of Northfield, Ill. under the trade name ZELEC. Another exemplary topical antistatic treatment is a 50% solution of potassium isobutyl phosphate available from Manufacturer's Chemical, LP, of Cleveland, Tenn. under the trade name QUADRASTAT.

While various patents have been incorporated herein by reference, to the extent there is any inconsistency between incorporated material and that of this written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A fluorochemical blend for imparting repellency, said fluorochemical blend comprising at least a first fluorochemical comprising a majority of first fluoroaliphatic groups having 4 or fewer carbon atoms and linked to said first fluorochemical by sulfonamide links, and a second fluorochemical comprising a majority of second fluoroaliphatic groups having 6 or more carbon atoms and linked to said second fluorochemical by alkyl links, wherein said fluorochemical blend constitutes greater than 10 percent by weight of said first fluorochemical.

2. The fluorochemical blend of claim 1 wherein said majority of said first fluoroaliphatic groups are perfluorinated 4 carbon groups.

3. The fluorochemical blend of claim 1 wherein said majority of said second fluoroaliphatic groups are perfluorinated 6 carbon groups.

4. The fluorochemical blend of claim 1 wherein said majority of said second fluoroaliphatic groups are perfluorinated 8 carbon groups.

5. The fluorochemical blend of claim 2 wherein said majority of said second fluoroaliphatic groups comprises a mixture of perfluorinated 6 carbon groups and perfluorinated 8 carbon groups.

6. The fluorochemical blend of claim 2 wherein said majority of said second fluoroaliphatic groups are perfluorinated 6 carbon groups.

7. The fluorochemical blend of claim 2 wherein said majority of said second fluoroaliphatic groups are perfluorinated 8 carbon groups.

8. The fluorochemical blend of claim 1 wherein said fluorochemical blend comprises greater than 20 percent by weight of said first fluorochemical.

9. The fluorochemical blend of claim 8 wherein said fluorochemical blend comprises greater than 40 percent by weight of said first fluorochemical.

10. The fluorochemical blend of claim 9 wherein said fluorochemical blend comprises greater than 60 percent by weight of said first fluorochemical.

11. The fluorochemical blend of claim 1, wherein said alkyl links include ethylene links.

* * * * *